United States Patent
Hamada

(10) Patent No.: US 11,991,773 B2
(45) Date of Patent: May 21, 2024

(54) COMMUNICATION APPARATUS, CONTROL METHOD, AND STORAGE MEDIUM

(71) Applicant: CANON KABUSHIKI KAISHA, Tokyo (JP)

(72) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/833,595

(22) Filed: Jun. 6, 2022

(65) Prior Publication Data
US 2022/0304101 A1    Sep. 22, 2022

Related U.S. Application Data

(63) Continuation of application No. 16/838,970, filed on Apr. 2, 2020, now Pat. No. 11,375,570.

(30) Foreign Application Priority Data

Apr. 22, 2019  (JP) .................... 2019-081071

(51) Int. Cl.
*H04W 76/27*    (2018.01)
*H04W 4/02*     (2018.01)
*H04W 76/15*    (2018.01)

(52) U.S. Cl.
CPC .......... *H04W 76/27* (2018.02); *H04W 4/027* (2013.01); *H04W 76/15* (2018.02)

(58) Field of Classification Search
CPC ...... H04W 76/27; H04W 76/15; H04W 4/027
USPC ........................................... 370/328
See application file for complete search history.

(56) References Cited

U.S. PATENT DOCUMENTS

| | | | | |
|---|---|---|---|---|
| 11,375,570 B2* | 6/2022 | Hamada | ............ | H04W 4/027 |
| 11,445,359 B2* | 9/2022 | Jha | ............ | H04W 60/04 |
| 2015/0334673 A1* | 11/2015 | Mathias | ............ | H04W 68/02 |
| | | | | 455/426.1 |
| 2018/0270713 A1* | 9/2018 | Park | ............ | H04L 5/0053 |
| 2019/0116629 A1* | 4/2019 | Hapsari | ............ | H04W 76/27 |
| 2019/0288781 A1* | 9/2019 | Zhao | ............ | H04W 4/40 |
| 2020/0229133 A1* | 7/2020 | Yi | ............ | H04W 76/28 |
| 2021/0136649 A1* | 5/2021 | Shah | ............ | H04W 74/0833 |
| 2022/0167448 A1* | 5/2022 | Palle | ............ | H04W 76/30 |

* cited by examiner

*Primary Examiner* — Mong-Thuy T Tran
(74) *Attorney, Agent, or Firm* — Canon U.S.A., Inc. IP Division

(57) ABSTRACT

A communication apparatus includes a transition unit and a control unit. In a case where a wireless communication path to each of a first base station and a second base station is established, the transition unit transitions from an RRC_CONNECTED state to an RRC_INACTIVE state compliant with a 3rd Generation Partnership Project (3GPP) standard. In a case where the transition unit transitions to the RRC_INACTIVE state, the control unit performs control to selectively execute operating in a first mode for waiting for a notification signal from each of the first and second base stations or operating in a second mode for waiting for a notification signal from either the first base station or the second base station, based on a state of the communication apparatus.

8 Claims, 14 Drawing Sheets

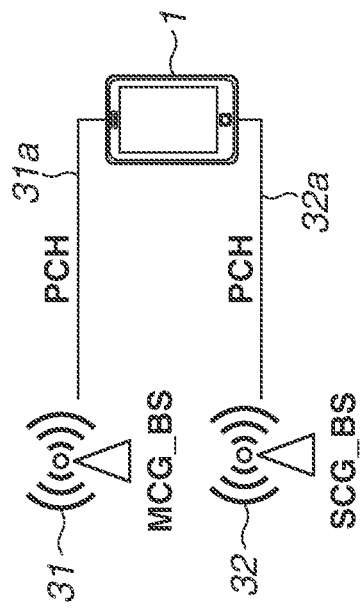
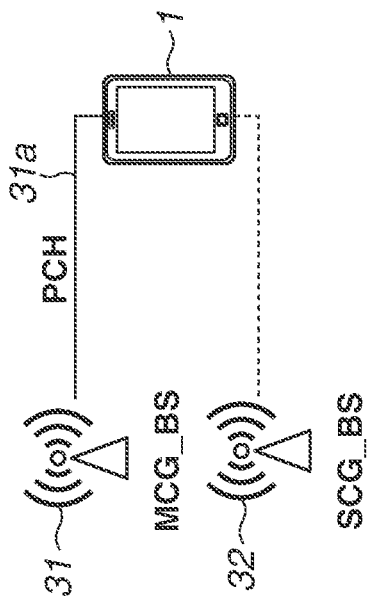
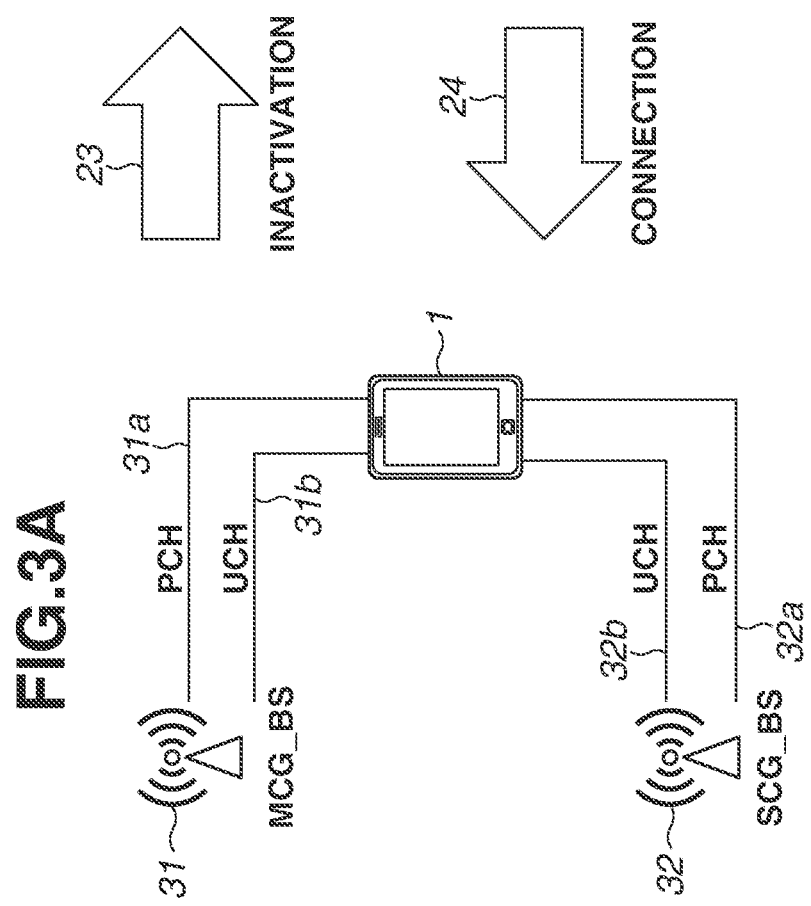

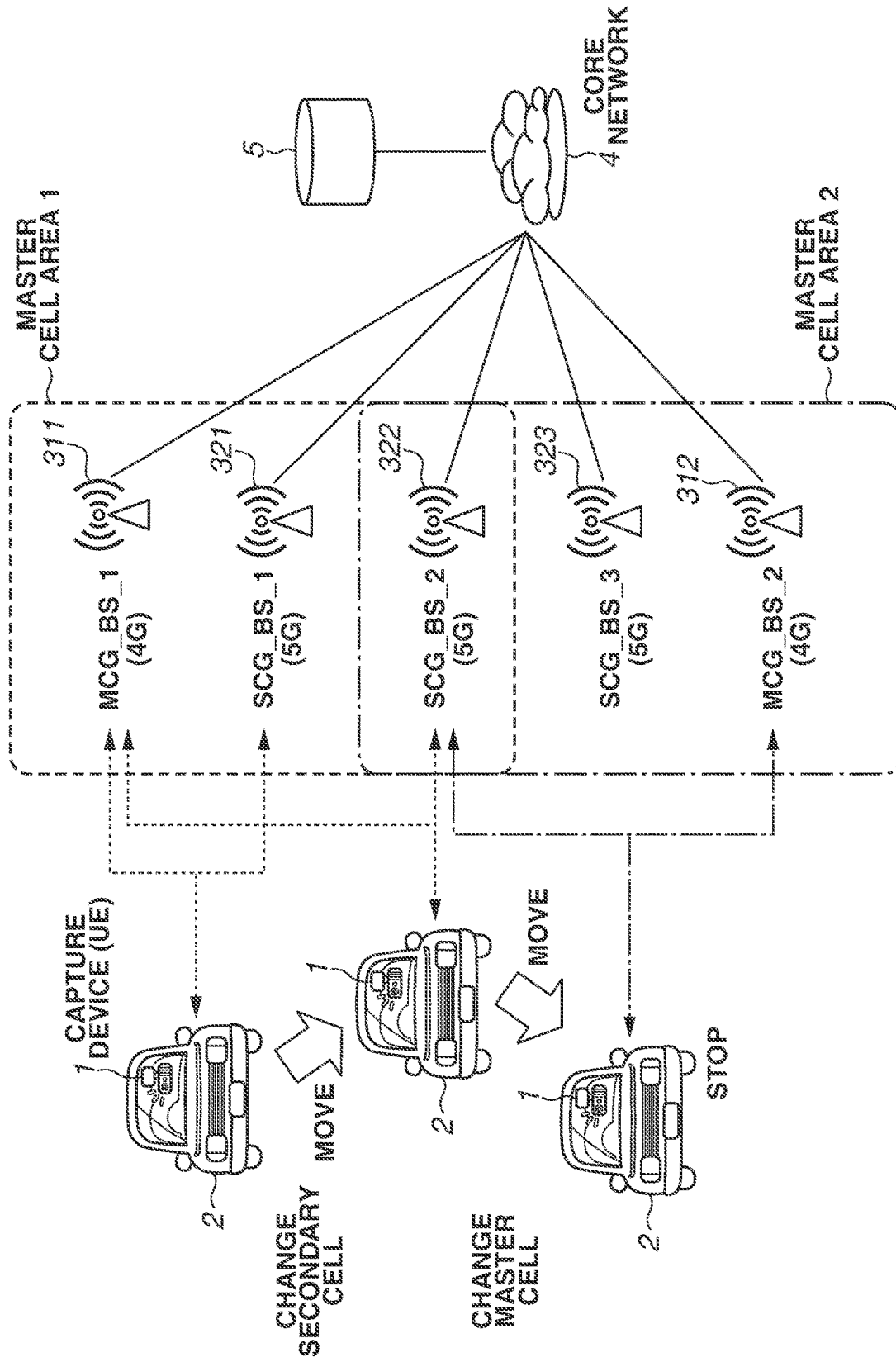

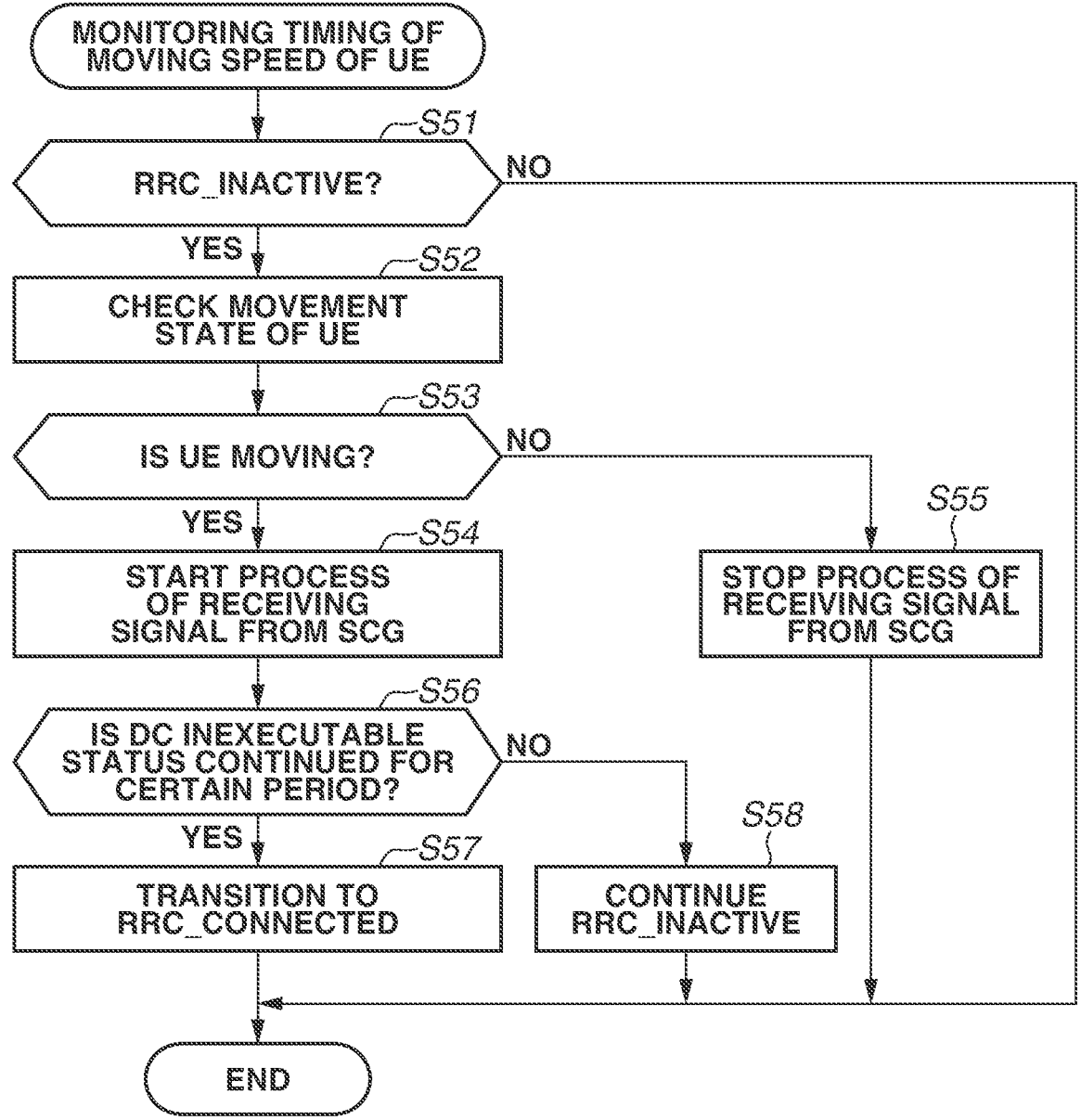

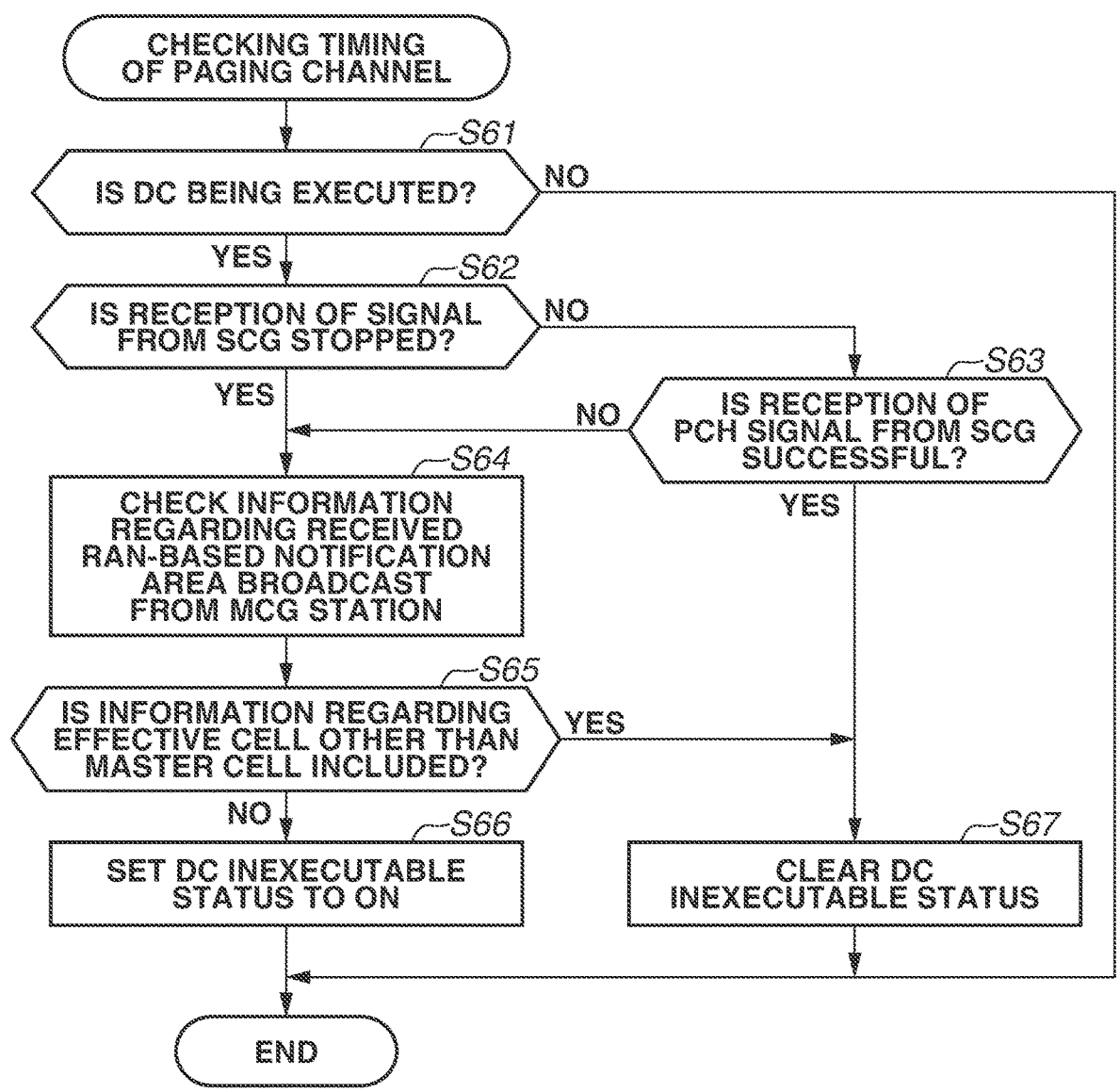

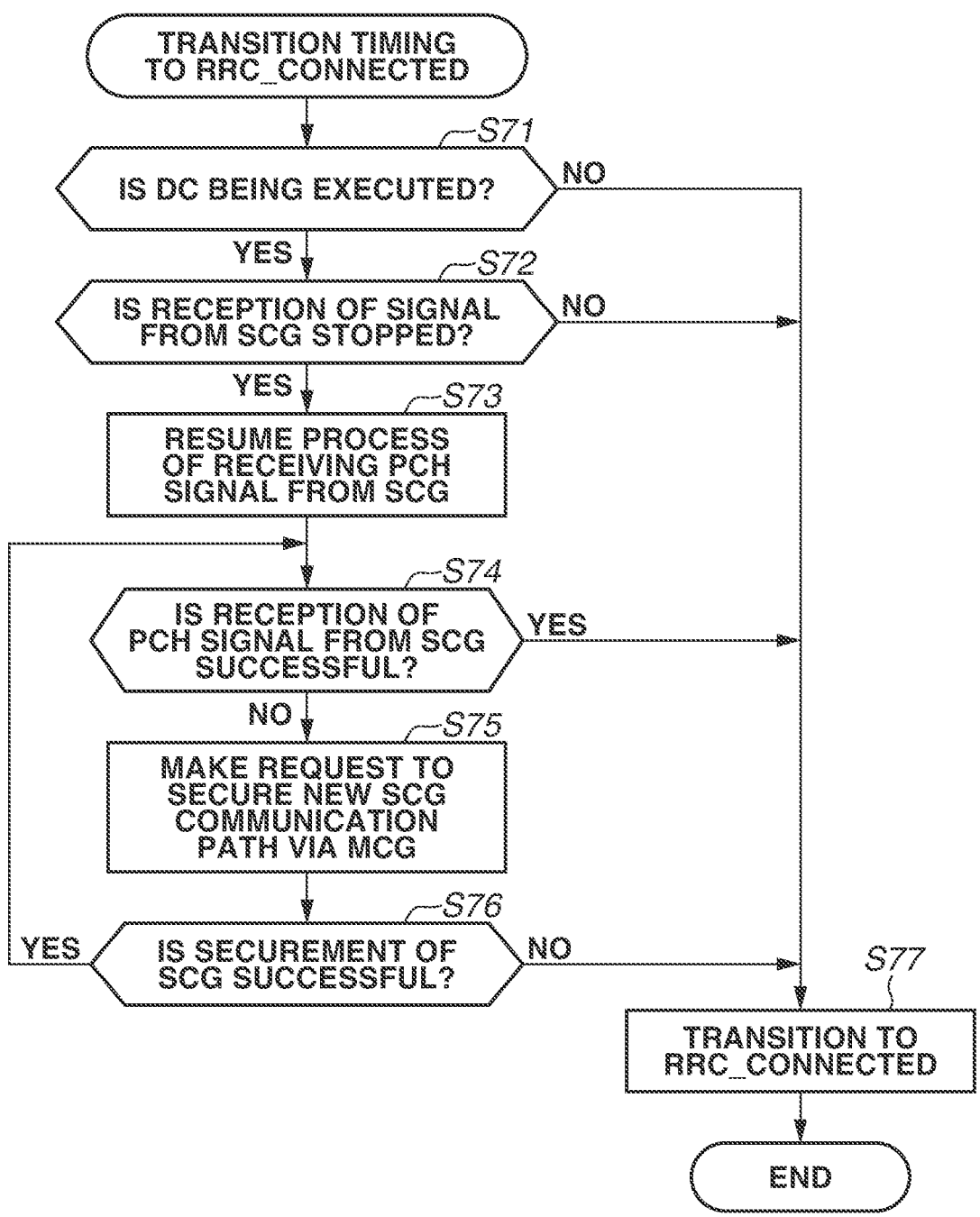

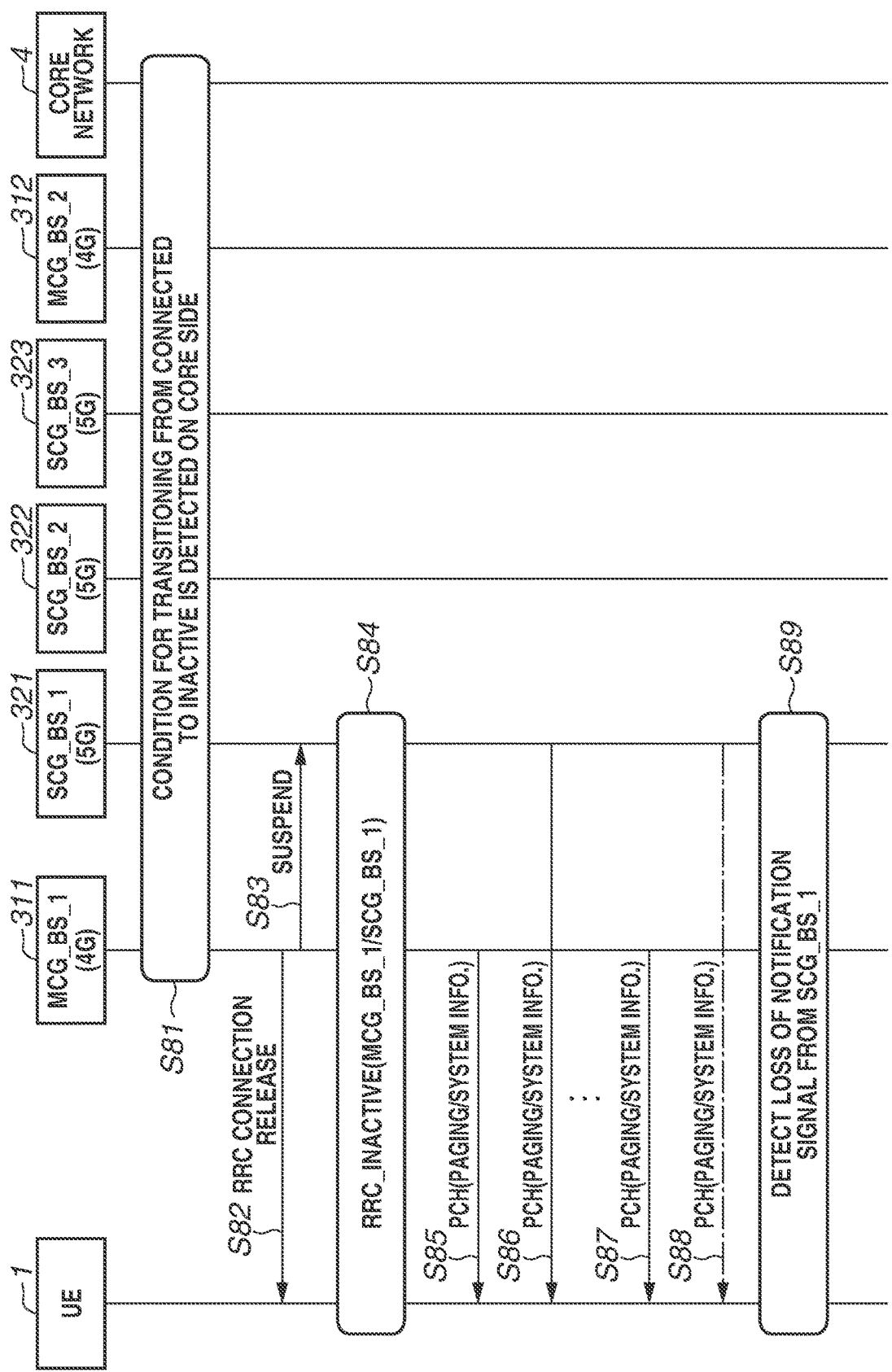

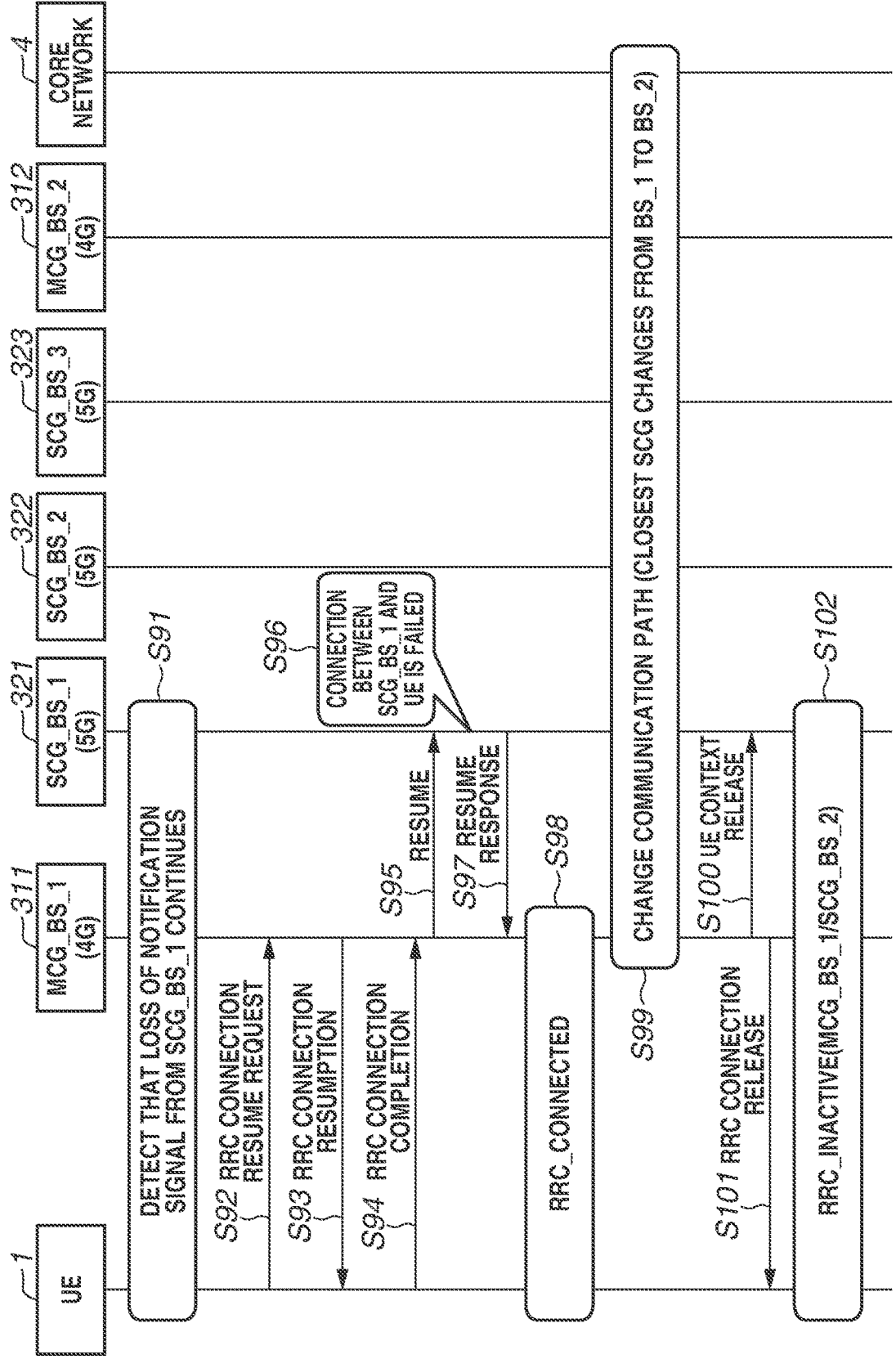

COMMUNICATION APPARATUS, CONTROL METHOD, AND STORAGE MEDIUM

CROSS-REFERENCE TO RELATED APPLICATIONS

The present application is a continuation of U.S. patent application Ser. No. 16/838,970, filed on Apr. 2, 2020, which claims priority from Japanese Patent Application No. 2019-081071 filed Apr. 22, 2019, which are hereby incorporated by reference herein in their entireties.

BACKGROUND

Field

The present disclosure relates to a communication apparatus that can connect to a plurality of networks.

Description of the Related Art

A communication apparatus (user equipment (UE)) connected to a fourth generation (4G) public wireless communication line transitions between a plurality of states. More specifically, the communication apparatus transitions between two states, i.e., RRC_CONNECTED, which is a state where a communication band is secured and unicast data communication is being performed, and RRC_IDLE, which is a state where the communication band is not secured and the unicast data communication is not performed. In the RRC_IDLE state, the communication apparatus can only receive broadcast data.

In a communication apparatus connected to a fifth generation (5G) New Radio (NR) public wireless network, RRC_INACTIVE is added to the above two states. In the RRC_INACTIVE state, a communication band is secured and unicast data communication is not performed. In other words, the communication apparatus can only receive broadcast data. Using the transition between a plurality of Radio Resource Control (RRC) states, it is possible to save power and make efficient use of wireless communication resources.

US2013/0163497 discusses a mobile station that identifies whether a plurality of carrier bands in a carrier aggregation is continuous or intermittent, and can switch a timer for intermittent reception that is installed for a primary cell and a secondary cell to be common or independent. Intermittent reception control corresponding to the transmission cycle of a control signal from a base station is executed in the carrier aggregation, whereby it is possible to save the high power consumption of the mobile station.

SUMMARY

In fifth generation (5G) New Radio (NR), a communication apparatus can use dual connectivity (DC), in which the communication apparatus connects to a plurality of base stations (BSs) via a public wireless communication line and simultaneously provides communication services. A plurality of carriers is bundled between the plurality of base stations, whereby it is possible to perform broadband data communication.

However, the 3rd Generation Partnership Project (3GPP) standard does not define details of operation of the communication apparatus that is using two base stations based on DC in a case where the communication apparatus transitions to RRC_INACTIVE.

More specifically, the 3GPP standard defines that, during RRC_INACTIVE, the communication apparatus needs to monitor a paging channel (PCH), which is a control channel via which a control signal transmitted from a base station in use to all communication apparatuses in a cell is received. However, the 3GPP standard does not define whether the communication apparatus that is executing DC needs to monitor a PCH for a base station for a master cell group or a PCH for a base station for a secondary cell group during RRC_INACTIVE.

During RRC_INACTIVE, if the communication apparatus continues monitoring the PCHs for both the base station for the master cell group and the base station for the secondary cell group, the standby power increases.

On the other hand, during RRC_INACTIVE, if the communication apparatus monitors, for example, only the PCH for the base station for the master cell group, the communication apparatus cannot detect a change in quality of wireless line of the base station for the secondary cell group. Thus, the communication apparatus cannot determine whether the communication apparatus can return to RRC_CONNECTED based on DC using the two base stations until the communication apparatus returns to RRC_CONNECTED. This reduces responsiveness of the communication apparatus when resuming a service on standby for execution.

According to an aspect of the present disclosure, a communication apparatus includes a transition unit configured to, in a case where a wireless communication path to each of a first base station and a second base station is established, transition from an RRC_CONNECTED state to an RRC_INACTIVE state compliant with a 3rd Generation Partnership Project standard, and a control unit configured to, in a case where the transition unit transitions to the RRC_INACTIVE state, perform control to selectively execute operating in a first mode for waiting for a notification signal from each of the first and second base stations or operating in a second mode for waiting for a notification signal from either the first base station or the second base station, based on a state of the communication apparatus.

Further features of the present disclosure will become apparent from the following description of exemplary embodiments with reference to the attached drawings.

BRIEF DESCRIPTION OF THE DRAWINGS

FIGS. 3A, 3B, and 3C are diagrams each illustrating a monitoring state of paging channels (PCHs) in RRC_CONNECTED and RRC_INACTIVE while dual connectivity (DC) is being executed.

FIG. 4 is a diagram illustrating an example of a network configuration of a system where a captured image captured by a capture device (UE) that moves between cells is uploaded according to the first exemplary embodiment.

FIG. 5 is a flowchart illustrating an example of a processing procedure of a monitoring control process executed when the communication apparatus according to the first exemplary embodiment monitors a moving speed of the communication apparatus.

FIG. 6 is a flowchart illustrating an example of a processing procedure of a process in which the communication apparatus according to the first exemplary embodiment checks a PCH signal received from a PCH during RRC_INACTIVE.

FIG. 7 is a flowchart illustrating an example of a processing procedure of a process in which the communication apparatus according to the first exemplary embodiment checks the PCH signal received from the PCH when the communication apparatus transitions to RRC_CONNECTED.

FIG. 8 is a diagram illustrating an example of a processing sequence between the communication apparatus according to the first exemplary embodiment and a plurality of cell groups when the communication apparatus moves between a plurality of wireless cells.

FIG. 9 is a diagram illustrating an example of a processing sequence between the communication apparatus according to the first exemplary embodiment and the plurality of cell groups when the communication apparatus moves between the plurality of wireless cells.

DESCRIPTION OF THE EMBODIMENTS

Exemplary embodiments for carrying out the present disclosure will be described in detail below with reference to the attached drawings. The exemplary embodiments described below are examples of implementation means of the present disclosure and can be appropriately modified or changed depending on the configuration of an apparatus to which the present disclosure is applied and various conditions. Thus, the present disclosure is not limited to the following particular exemplary embodiments. Further, not all combinations of the features described in the exemplary embodiments are necessarily indispensable to the solving means of the present disclosure.

A description is given below of an example where a communication apparatus is capable of performing public wireless communication based on dual connectivity (hereinafter referred to as DC) compliant with the Third Generation Partnership Project (3GPP) standard. However, the present exemplary embodiment is not limited to this example. For example, the communication apparatus may use another method capable of connecting to a plurality of base stations (BSs) and simultaneously providing communication services.

Further, a description is given below of an example where the communication apparatus is an imaging apparatus that can record, in the imaging apparatus, a moving image being captured and can also stream a moving image and distribute a still image via a public wireless communication line, where necessary. However, the present exemplary embodiment is not limited to this example. The communication apparatus may be any communication apparatus having a function of executing public wireless communication based on DC. Examples of the communication apparatus include a digital video camera, a mobile phone, a smartphone, a personal computer (PC), a laptop computer, and a server, but are not limited to these examples. The communication apparatus may be a movable object or a stationary object, or may be included in a movable object.

<Hardware and Function Configuration of Communication Apparatus>

Figure 1:
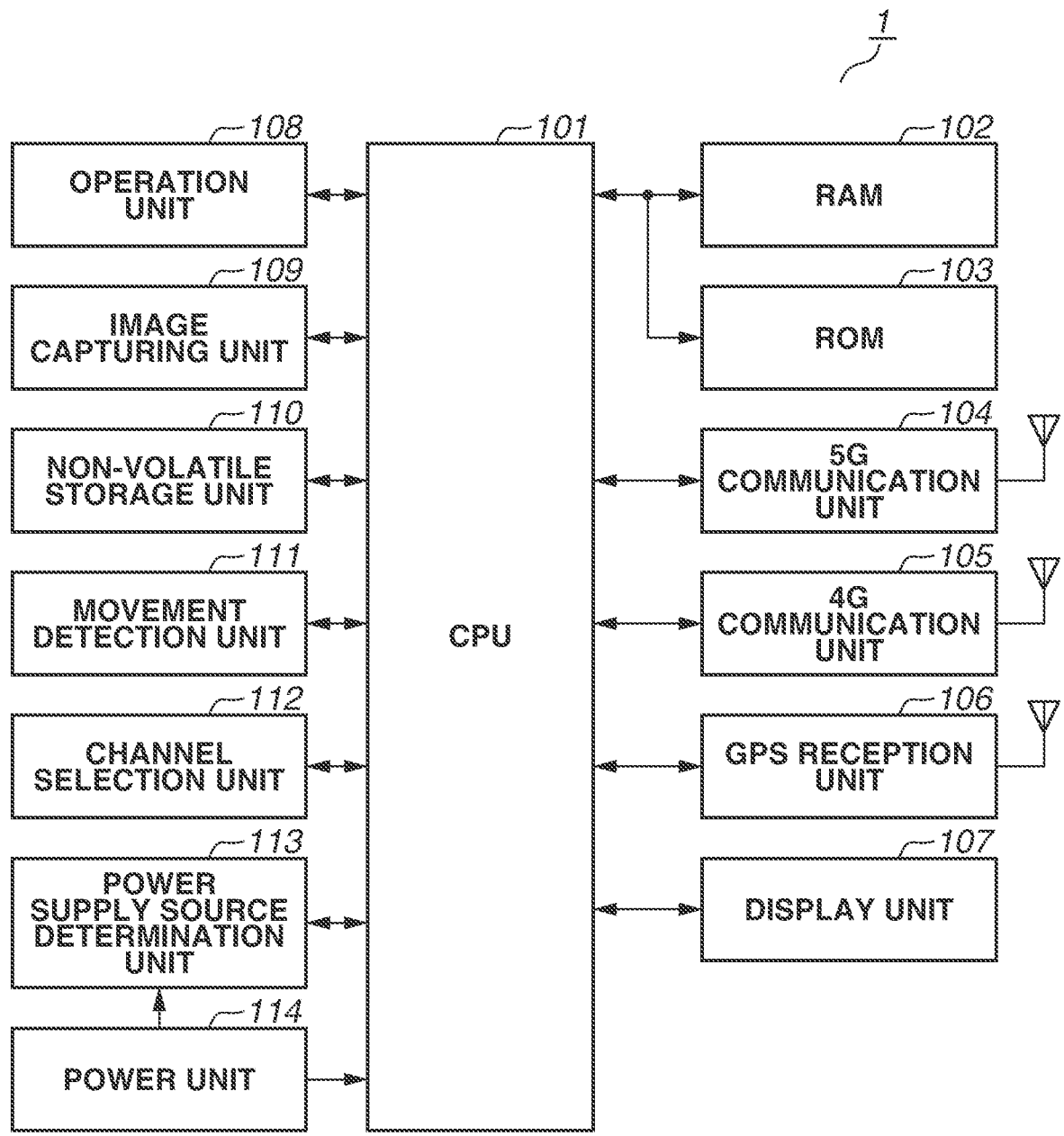
FIG. 1 is a block diagram illustrating an example of a hardware and functional configuration of a communication apparatus according to a first exemplary embodiment.

FIG. 1 is a diagram illustrating an example of the hardware and function configuration of a communication apparatus according to a first exemplary embodiment.

A communication apparatus (user equipment (hereinafter referred to as UE) 1 in FIG. 1 includes a central processing unit (CPU) 101, a random access memory (RAM) 102, a read-only memory (ROM) 103, a fifth generation (5G) communication unit 104, a fourth generation (4G) communication unit 105, a global positioning system (GPS) reception unit 106, a display unit 107, an operation unit 108, and an image capturing unit 109.

The UE 1 further includes a non-volatile storage unit 110, a movement detection unit 111, a channel selection unit 112, a power supply source determination unit 113, and a power unit 114.

The components of the UE 1 in FIG. 1 are connected with each other via a system bus so that the components can communicate with each other. The UE 1 does not need to include all of the above modules, and can include another module in addition to the configuration in FIG. 1.

The CPU 101 performs overall control on operation of the UE 1 and controls the components (102 to 114) via the system bus. More specifically, in executing various processes, the CPU 101 implements various functional operations by loading a necessary program from a storage medium such as the ROM 103 or the non-volatile storage unit 110 into the RAM 102 and executing the program.

The RAM 102 functions as a main memory and a work area for the CPU 101 and temporarily stores a program and data.

The ROM 103 is a non-volatile memory that stores a control program and a parameter that do not need to be changed and that are necessary for the CPU 101 to execute various processes. The control program and the parameter can be stored in the non-volatile storage unit 110, an external memory, or an attachable and detachable storage medium (not illustrated).

The 5G communication unit 104 is a communication module for the UE 1 to connect to a 5G public wireless communication network.

The 4G communication unit 105 is a communication module for the UE 1 to connect to a 4G public wireless communication network.

The GPS reception unit 106 receives a signal from the GPS.

The display unit 107 displays and outputs, for example, an image captured by the image capturing unit 109 and stored in the non-volatile storage unit 110 or displays and outputs processing results of various processes such as an operation result of the operation unit 108.

The operation unit 108 includes an image capturing button and a network setting button and provides a user interface to the CPU 101 and the components.

The image capturing unit 109 includes an optical lens and a charge-coupled device (CCD) and captures an image such as a still image or a moving image.

The non-volatile storage unit 110 includes a non-volatile memory and stores the moving image or the still image captured by the image capturing unit 109. The non-volatile storage unit 110 can store various programs and parameters.

The movement detection unit 111 detects a movement of the UE 1.

Based on a result of detecting the movement thereof by the movement detection unit 111, the channel selection unit 112 selects a base station (BS) from among a plurality of base stations (BSs) connected to the UE 1. A paging signal from a paging channel (hereinafter referred to as a PCH) corresponding to the selected base station is to be monitored. The PCH is a control channel via which data can be transmitted from the BS to all pieces of UE in a cell. The paging signal (hereinafter referred to as a PCH signal) is a notification signal for controlling that is transmitted from the base station to all of the pieces of UE via the PCH.

The power supply source determination unit 113 determines the type of a power supply that is feeding power to the UE 1 or an apparatus including the UE 1.

The power unit 114 supplies power to the components of the UE 1 or the apparatus including the UE 1.

<State Transition of Communication Apparatus>

Figure 2:
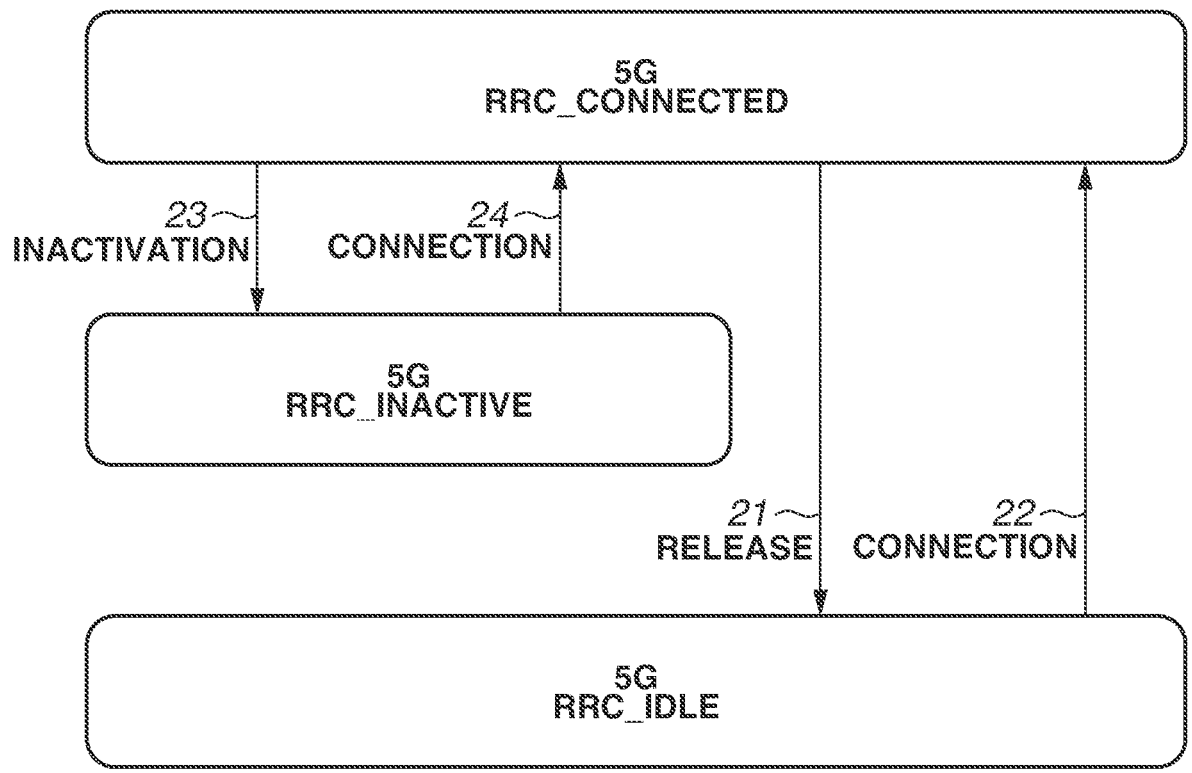
FIG. 2 is a diagram illustrating state transition of the communication apparatus (user equipment (UE)) defined by the 3rd Generation Partnership Project (3GPP).

FIG. 2 is a diagram illustrating a state transition of the UE 1 compliant with the 5G public wireless communication standard defined in the 3GPP standard.

The UE 1 transitions between three states. RRC_CONNECTED is the state (mode) where a unicast wireless communication path to a BS is connected, a wireless communication resource for data communication is allocated, and the UE 1 can perform unicast data communication.

If receiving a release signal 21 of radio resource control (RRC) from the base station (BS), the UE 1 transitions to RRC_IDLE.

RRC_IDLE is a state (mode) where the unicast wireless communication path to the BS is not connected, the wireless communication resource for data communication is released, and the UE 1 cannot perform the unicast data communication. In RRC_IDLE, the UE 1 can only receive a control signal broadcast from the BS.

If receiving a connection signal 22 of RRC from the BS, the UE 1 returns to RRC_CONNECTED.

If receiving an inactivation signal 23 of RRC from the BS in the RRC_CONNECTED state, the UE 1 transitions to RRC_INACTIVE.

RRC_INACTIVE is a mode where the unicast wireless communication path to the BS is not connected, but the wireless communication resource for data communication remains to be allocated. In RRC_INACTIVE, the UE 1 cannot perform the unicast data communication, but can only receive a control signal broadcast from the BS.

If receiving a connection signal 24 of RRC from the BS, the UE 1 returns to RRC_CONNECTED.

FIGS. 3A, 3B, and 3C are diagrams schematically illustrating a use state of wireless communication path where the UE 1, which is executing DC, uses the wireless communication path to a plurality of BSs via a public wireless communication network. FIG. 3A illustrates the use state of the wireless communication path in RRC_CONNECTED. FIGS. 3B and 3C illustrate the use state of the wireless communication path in RRC_INACTIVE.

In RRC_CONNECTED in FIG. 3A, if receiving the inactivation signal 23 from a base station (MCG_BS) 31 that controls a group of master cells, the UE 1 transitions to RRC_INACTIVE. A master cell (primary cell) is a cell that guarantees connection between the UE 1 and a wireless network. Hereinafter, a base station (MCG_BS) that controls a group of master cells is referred to as a master cell base station.

In RRC_INACTIVE in FIGS. 3B and 3C, if receiving the connection signal 24 from the master cell base station (MCG_BS) 31, the UE 1 returns to RRC_CONNECTED.

With reference to FIG. 3A, in RRC_CONNECTED, the UE 1 monitors a PCH 31*a* via which the master cell base station (MCG_BS) 31 transmits a PCH signal. Simultaneously, the UE 1 monitors a PCH 32*a* via which a base station (SCG_BS) 32 that controls a group of secondary cells transmits a PCH signal. A secondary cell is a cell that provides a wireless communication resource in addition to the master cell. Hereinafter, a base station (SCG_BS) that controls a group of secondary cells is referred to as a secondary cell base station.

The UE 1 holds a user channel (UCH) 31*b* via which data is transmitted to and received from the master cell base station (MCG_BS) 31, and a UCH 32*b* via which data is transmitted to and received from the secondary cell base station (SCG_BS) 32.

In the 5G public wireless communication standard, in RRC_INACTIVE, the UE1 continues monitoring of the PCHs while releasing wireless connection of UCHs. Since the UE1 holds the wireless communication resource for the base station, a procedure for reconnecting to the same base station is simplified.

However, the 5G public wireless communication standard does not define behavior regarding which PCH to monitor if the UE 1 executing DC transitions from RRC_CONNECTED to RRC_INACTIVE.

Thus, two methods illustrated in FIGS. 3B and 3C are possible.

FIG. 3B illustrates a case where the UE 1 continues monitoring of a PCH signal from both the PCH 31*a* for the master cell base station (MCG_BS) 31 and the PCH 32*a* for the secondary cell base station (SCG_BS) 32.

FIG. 3C illustrates a case where the UE 1 continues the monitoring of a PCH signal from the PCH 31*a* for the master cell base station (MCG_BS) 31, while the UE 1 discontinues the monitoring of a PCH signal from the PCH 32*a* for the secondary cell base station (SCG_BS) 32.

In the method in FIG. 3B, even during RRC_INACTIVE, the UE 1 continues monitoring of the PCHs for both the master cell base station (MCG_BS) 31 and the secondary cell base station (SCG_BS) 32. Thus, when the UE 1 returns to RRC_CONNECTED, the UE 1 can determine in advance whether a unicast wireless communication path for DC can be set. This improves responsiveness in resuming a service by the UE 1 on standby, but does not minimize power consumption of the UE 1.

On the other hand, in the method in FIG. 3C, the UE 1 transitions to the monitoring of the PCH 31*a* for the master cell base station (MCG_BS) 31 only. Thus, the power consumption of the UE 1 can be as minimized as that in the RRC_IDLE state. However, the UE 1 cannot determine whether the unicast wireless communication path for DC can be set unless the UE 1 returns to RRC_CONNECTED. This reduces the responsiveness in resuming the service by the UE 1 on standby.

As described above, whether to prioritize the power consumption or an improvement in the responsiveness in resuming the service differs depending on the characteristics of the service using DC and the state of the UE 1. Thus, in RRC_INACTIVE, it is difficult to uniquely determine which of the methods in FIGS. 3B and 3C is to be used.

In the present exemplary embodiment, depending on the state of the UE 1 and the characteristics of the service, a PCH signal from which PCH is to be monitored is selected. Details of such channel selection processing in the present exemplary embodiment will be described below with reference to FIGS. 5 to 11.

FIG. 4 illustrates an example of a use case of the UE 1 according to the present exemplary embodiment and illustrates an example of a network system where the UE 1 as a capture device, i.e., an in-vehicle camera, captures an image while a vehicle is moving or stopped, and the UE 1 uploads the captured image to a server.

A vehicle 2 in FIG. 4 includes the UE 1 mounted thereon as an in-vehicle camera. The vehicle 2 travels from a position within a master cell area 1 indicated by a dashed line in FIG. 4 to a position within a master cell area 2 indicated by a dashed-dotted line. In the master cell area 1, a master cell base station (MCG_BS_1) 311 controls master cells. In the master cell area 2, a master cell base station (MCG_BS_2) 312 controls master cells. Secondary cell base stations (SCG_BS_1 to SCG_BS_3) 321 to 323 each control secondary cells.

Using DC that enables securement of broadband communication, the UE 1 secures a unicast wireless communication path to each of the master cell base stations (MCG_BS_1 and 2) 311 and 312 and the secondary cell base stations (SCG_BS_1 to 3) 321 to 323. Via a core network 4 that accommodates the master cell base stations (MCG_BS_1 and 2) 311 and 312 and the secondary cell base stations (SCG_BS_1 to 3) 321 to 323, the UE 1 uploads a captured image to a database 5 in the server. In the database 5, the uploaded captured image can be configured as, for example, a dynamic map obtained by adding various additional information necessary to support self-driving of a vehicle to three-dimensional geospatial information. Details of the configuration of the dynamic map will be described below with reference to FIG. 12.

During a period when the captured image is to be uploaded, the UE 1 mounted on the vehicle 2 is in RRC_CONNECTED. During a period when the captured image is not to be uploaded, the UE 1 makes a state transition to RRC_INACTIVE.

Caused by the movement of the vehicle 2, the UE 1 controls a handover between the master cell base stations (MCG_BS_1 and 2) 311 and 312 and a handover between the secondary cell base stations (SCG_BS_1 to 3) 321 to 323.

A description is given below of control to select a PCH to be monitored by the UE 1 according to the present exemplary embodiment. An example of a case is used where cells are switched while the UE 1 as the capture device is waiting for the upload service of the captured image to start.

<PCH Automatic Selection Process Based on Monitoring of Moving Speed of UE 1>

FIG. 5 is a flowchart illustrating an example of a processing procedure of a monitoring control process executed when the UE 1 according to the first exemplary embodiment monitors the moving speed of the UE 1.

The UE 1 monitors a movement state of the UE 1 as an internally controlled state of the UE 1 in a constant cycle. At each monitoring timing of the moving speed, the UE 1 starts the processing in FIG. 5.

In step S51, the 5G communication unit 104 of the UE 1 determines whether the UE 1 is currently connected based on DC and is in RRC_INACTIVE.

If the UE 1 is not currently connected based on DC or is not in RRC_INACTIVE (NO in step S51), the monitoring procedure of PCH signals to the UE 1 via the PCHs is uniquely determined based on the 5G public wireless communication standard. Thus, the processing ends.

If the UE 1 is currently connected based on DC and is in RRC_INACTIVE (YES in step S51), then in step S52, the movement detection unit 111 of the UE 1 detects the movement state of the UE 1 and supplies the result of the detection of the movement to the CPU 101, and the processing proceeds to step S53.

In step S53, based on the result of the detection of the movement from the movement detection unit 111, the CPU 101 of the UE 1 determines whether the UE 1 is moving. If the UE 1 is not moving (NO in step S53), the processing proceeds to step S55.

In step S55, the channel selection unit 112 of the UE 1 stops monitoring of a PCH signal transmitted from the secondary cell base station (SCG_BS_1) 321 for a group of secondary cells (SCG) of the UE 1 to the UE 1 via the PCH 32a, and the processing ends.

If the UE 1 is moving in step S53 (YES in step S53), the processing proceeds to step S54.

In step S54, the channel selection unit 112 of the UE 1 starts monitoring of the PCH signal transmitted from the secondary cell base station (SCG_BS_1) 321 to the UE 1 via the PCH 32a, and the processing proceeds to step S56.

In step S56, the CPU 101 of the UE 1 determines whether, a status where DC cannot be executed (hereinafter referred to as a DC inexecutable status) is defined and is continued for a certain period. The DC inexecutable status referenced in step S56 is set by executing processing described below with reference to FIG. 6.

If it is determined that it is within the certain period after transition to the DC inexecutable status (NO in step S56), the processing proceeds to step S58. In step S58, the CPU 101 of the UE 1 continues the RRC_INACTIVE state and ends the processing of a series of processes executed at the monitoring timing of the movement.

If it is determined that the DC inexecutable status continues exceeding the certain period (YES in step S56), the processing proceeds to step S57. In step S57, the 5G communication unit 104 of the UE 1 transitions to RRC_CONNECTED, and the processing ends.

After a return to RRC_CONNECTED is completed, the UE 1 sets a wireless communication path for DC again based on control defined in the 5G public wireless communication standard.

<DC Inexecutable Status Monitoring Process by UE>

FIG. 6 is a flowchart illustrating an example of a processing procedure of a process for determining whether execution of DC can be maintained and for setting status information regarding the DC inexecutable status. The processing procedure is executed by the UE 1 every time a monitoring timing of the PCHs comes.

By monitoring the PCHs in a constant cycle, the UE 1 determines whether the execution of DC can be maintained. At each monitoring timing of the PCHs, the UE 1 starts the processing in FIG. 6. When the processing in FIG. 6 is executed, the UE 1 is in the RRC_INACTIVE state.

In step S61, the 5G communication unit 104 of the UE 1 determines whether the UE 1 is executing DC.

If the UE 1 is not executing DC (NO in step S61), the monitoring procedure of PCH signals to the UE 1 via the PCHs is uniquely determined based on the 5G public wireless communication standard. Thus, the processing ends.

If the UE 1 is executing DC (YES in step S61), then in step S62, the 5G communication unit 104 of the UE 1 determines whether monitoring of the PCH signal transmitted from the secondary cell base station (SCG_BS_1) 321 to the UE 1 via the PCH 32a is stopped.

If the monitoring of the PCH 32a for the secondary cell base station (SCG_BS_1) 321 is not stopped (NO in step S62), the processing proceeds to step S63.

In step S63, the 5G communication unit 104 of the UE 1 determines whether reception of the PCH signal most recently transmitted from the secondary cell base station (SCG_BS_1) 321 to the UE 1 via the PCH 32a is successful.

If the reception of the PCH signal most recently transmitted from the secondary cell base station (SCG_BS_1) 321 to the UE 1 via the PCH 32a is successful (YES in step S63), the processing proceeds to step S67. If the reception of the PCH signal is not successful (NO in step S63), the processing proceeds to step S64.

In step S67, the CPU 101 of the UE 1 clears the DC inexecutable status held in the non-volatile storage unit 110, and the processing ends.

If the monitoring of the PCH 32a for the secondary cell base station (SCG_BS_1) 321 is stopped in step S62 (YES in step S62), then in step S64, the UE 1 checks content of a PCH signal transmitted from the master cell base station (MCG_BS_1) 311 via the PCH 31a.

More specifically, the CPU 101 of the UE 1 checks content of a radio access network (RAN)-based notification area, which is notification information that is broadcast using the PCH signal transmitted from the master cell base station (MCG_BS_1) 311.

In step S65, the CPU 101 of the UE 1 determines whether the content of the RAN-based notification area checked in step S64 includes information regarding a cell other than a master cell.

If the information regarding a cell other than a master cell, such as a secondary cell, is not included in the RAN-based notification area (NO in step S65), the processing proceeds to step S66. In step S66, the CPU 101 of the UE 1 sets the DC inexecutable status to on, and the processing ends.

If information regarding the cell other than the master cell, such as a secondary cell, is included in the RAN-based notification area (YES in step S65), the processing proceeds to step S67. In step S67, the CPU 101 of the UE 1 clears the DC inexecutable status, and the processing ends.

As described above, in the present exemplary embodiment, while the UE 1 is in the RRC_INACTIVE state, the UE 1 updates the DC inexecutable status prior to a wireless reconnection. Then, with continuance of the DC inexecutable status for a certain period as a trigger, the UE 1 transitions to RRC_CONNECTED.

<DC Connection Determination Processing Executed when UE 1 Transitions to RRC_CONNECTED>

FIG. 7 is a flowchart illustrating an example of a processing procedure of DC connection determination processing executed when the UE 1 transitions to RRC_CONNECTED.

Every time the UE 1 transitions to RRC_CONNECTED, the UE 1 starts the processing illustrated in FIG. 7. In step S71, the 5G communication unit 104 of the UE 1 determines whether the UE 1 is executing DC. If the UE 1 is not executing DC (NO in step S71), the processing proceeds to step S77. In step S77, the UE 1 immediately transitions to RRC_CONNECTED, and the processing ends.

If the UE 1 is executing DC (YES in step S71), the processing proceeds to step S72. In step S72, the 5G communication unit 104 of the UE 1 determines whether monitoring of the PCH signal transmitted from the secondary cell base station (SCG_BS_1) 321 to the UE 1 via the PCH 32a is stopped.

If the monitoring of the PCH signal from the PCH 32a for the secondary cell base station (SCG_BS_1) 321 is not stopped (NO in step S72), the processing proceeds to step S77. In step S77, the UE 1 immediately transitions to RRC_CONNECTED. If the monitoring of the PCH signal from the PCH 32a is stopped (YES in step S72), the processing proceeds to step S73.

In step S73, the 5G communication unit 104 of the UE 1 resumes the monitoring of the PCH signal transmitted from the secondary cell base station (SCG_BS_1) 321 to the UE 1 via the PCH 32a.

In step S74, the 5G communication unit 104 of the UE 1 determines whether the reception of the PCH signal from the secondary cell base station (SCG_BS_1) 321 via the PCH 32a is successful.

If the reception of the PCH signal from the secondary cell base station (SCG_BS_1) 321 via the PCH 32a is successful (YES in step S74), the processing proceeds to step S77. In step S77, the UE 1 immediately transitions to RRC_CONNECTED. If the reception of the PCH signal from the PCH 32a is not successful (NO in step S74), the processing proceeds to step S75.

In step S75, the 5G communication unit 104 of the UE 1 makes a request, via the master cell base station (MCG_BS_1) 311 for master cells, to secure a wireless communication path via a new secondary cell base station for secondary cells.

If securement of the wireless communication path via the new secondary cell base station requested in step S75 is not successful in step S76 (NO in step S76), the 5G communication unit 104 of the UE 1 discontinues the execution of DC, and the processing proceeds to step S77. In step S77, the UE 1 transitions to the RRC_CONNECTED state with only the master cell base station (MCG_BS_1) 311.

If the securement of the wireless communication path via the new secondary cell base station is successful (YES in step S76), the processing returns to step S74. In step S74, the UE 1 waits to receive a PCH signal from the new secondary cell base station secured in step S76.

<State Transition Sequence of Monitoring Control Processing with Movement of UE>

A state transition sequence of the monitoring control processing executed by the UE 1 according to the present exemplary embodiment is described below in chronological order with reference to FIGS. 8 to 11.

The UE 1 as the capture device is mounted on the vehicle 2 as illustrated in FIG. 4 and determines the movement state of the UE 1 using information from a sensor installed in the UE 1 or near the UE 1 in the vehicle 2. Then, while in RRC_INACTIVE, the UE 1 automatically selects a PCH to be monitored by the UE 1 based on the determined movement state of the UE 1.

With reference to FIG. 4, the vehicle 2 on which the UE 1 as the capture device is mounted is located in the master cell area 1, which is controlled by the master cell base station 311. At first, the UE 1 executes DC with the master cell base station (MCG_BS_1) 311 and the secondary cell base station (SCG_BS_1) 321 to use a wireless communication service. For example, the UE 1 uploads a captured image to the database 5 in the server for a dynamic map.

With reference to FIG. 8, for example, upload of the captured image to the database 5 in the server by the UE 1 is suspended. In this case, in step S81, the core network 4 and the master cell base station (MCG_BS_1) 311 and the secondary cell base station (SCG_BS_1) 321 on RAN detect suspension of payload data communication with the UE 1. Based on the detection of the suspension of the payload data communication, the core network 4 and the base stations (the master cell base station 311 and the secondary cell base station 321) recognize a condition for urging the UE 1 to transition from RRC_CONNECTED to RRC_INACTIVE.

In step S82, with recognition of the condition for urging the UE 1 to transition to RRC_INACTIVE as a trigger, the master cell base station (MCG_BS_1) 311 transmits, to the UE 1, a message indicating an instruction to release an RRC connection.

In step S83, the master cell base station (MCG_BS_1) 311 transmits, to the secondary cell base station (SCG_BS_1) 321, a message indicating an instruction to suspend communication to maintain a communication path secured for the UE 1.

Then, in step S84, the master cell base station (MCG_BS_1) 311 transitions to RRC_INACTIVE. With reception of the messages in steps S82 and S83 as a trigger, the UE 1 and the secondary cell base station (SCG_BS_1) 321 also transition to RRC_INACTIVE.

The UE 1, which has transitioned to RRC_INACTIVE, periodically executes the PCH checking process described above with reference to FIG. 6.

More specifically, the UE 1 executes the PCH checking process at a timing when the master cell base station (MCG_BS_1) 311 transmits the PCH signal to the UE 1 via the PCH 31a in step S85 and at a timing when the secondary cell base station (SCG_BS_1) 321 transmits the PCH signal to the UE 1 via the PCH 32a in step S86.

At this time, the vehicle 2 on which the UE 1 is mounted moves. At this stage, in step S87, the PCH signal from the master cell base station (MCG_BS_1) 311 is received by the UE 1, but in step S88, the reception of the PCH signal from the secondary cell base station (SCG_BS_1) 321 is failed. In this case, with a failure of the reception of the PCH signal transmitted to the UE 1 as a trigger, in step S89, the UE 1 detects loss of the PCH signal notified by the secondary cell base station (SCG_BS_1) 321 via the PCH 32a.

Detecting the loss of the PCH signal from the secondary cell base station (SCG_BS_1) 321 via the PCH 32a, in step S64 in FIG. 6, the UE 1 checks information regarding the RAN-based notification area notified by the master cell base station (MCG_BS_1) 311 using the PCH signal.

A description is given of an example in a case where information regarding an effective secondary cell is not included in the RAN-based notification area. In step S65 in FIG. 6, it is determined that the effective secondary cell other than a master cell is not included (NO in step S65). Then, in step S66, the UE 1 sets the DC inexecutable status when a wireless reconnection is made.

In a case where the vehicle 2 on which the UE 1 is mounted moves, the DC inexecutable status is set due to a continuous movement in a particular direction. Thus, even if the UE 1 continues waiting for the PCH signal to be notified by the secondary cell base station (SCG_BS_1) 321, the reception of the PCH signal to be notified by the secondary cell base station (SCG_BS_1) 321 is not restored.

As described with reference to FIG. 5, with continuance of the DC inexecutable status for a certain period or more as a trigger, the UE 1 transitions to RRC_CONNECTED with the master cell base station (MCG_BS_1) 311. Then, when the UE 1 transitions to RRC_CONNECTED with the master cell base station (MCG_BS_1) 311, in step S75, the UE 1 requests, via the master cell base station (MCG_BS_1) 311, the core network 4 to assign a new secondary cell base station.

With reference to FIG. 9, a description is given of an example of the control sequence for the UE 1 associated with the request to assign the new secondary cell base station.

In step S91, the UE 1 detects that the loss of the signal has continued for a certain period after the PCH signal notified by the secondary cell base station (SCG_BS_1) 321 via the PCH 32a is lost. With the loss of the PCH signal notified by the secondary cell base station (SCG_BS_1) 321 as a trigger, as illustrated in FIG. 7, the UE 1 transitions to RRC_CONNECTED with the master cell base station (MCG_BS_1) 311.

Referring back to FIG. 9, in step S92, the UE 1 transmits a resume request to resume the RRC connection to the master cell base station (MCG_BS_1) 311.

Receiving the resume request to resume the RRC connection, in step S93, the master cell base station (MCG_BS_1) 311 returns a reconnection message (resume) regarding the RRC connection to the UE 1 and instructs the UE 1 to reconnect to the master cell base station (MCG_BS_1) 311.

Receiving the reconnection message (resume) regarding the RRC connection, in step S94, the UE 1 restores a wireless connection with the master cell base station (MCG_BS_1) 311. Then, the UE 1 returns a reconnection completion message (resume complete) regarding the RRC connection to the master cell base station (MCG_BS_1) 311 and notifies the master cell base station (MCG_BS_1) 311 of the completion of the reconnection.

If the master cell base station (MCG_BS_1) 311 receives the reconnection completion message regarding the RRC connection from the UE 1, in step S95, the master cell base station (MCG_BS_1) 311 transmits a reconnection message (resume) to the secondary cell base station (SCG_BS_1) 321.

In step S96, a wireless connection between the secondary cell base station (SCG_BS_1) 321 and the UE 1 is failed due to deterioration of quality of a wireless line caused by the movement of the vehicle 2. Thus, in step S97, the secondary cell base station (SCG_BS_1) 321 notifies the master cell base station (MCG_BS_1) 311 of the failure of the wireless connection using a reconnection response message (resume response).

In step S98, with continuance of the DC inexecutable status for a certain period as a trigger, the UE 1 secures a unicast wireless communication path to the master cell base station (MCG_BS_1) 311, executes the processing in FIG. 7, and transitions to RRC_CONNECTED.

In step S99, the master cell base station (MCG_BS_1) 311 secures a communication path for a new secondary cell base station and changes the communication path for the secondary cell base station. More specifically, the master cell base station (MCG_BS_1) 311 changes the communication path for the secondary cell base station to a communication path for a new secondary cell base station (SCG_BS_2) 322. This is a process executed due to a change of the closest secondary cell base station to the UE 1 from the secondary cell base station (SCG_BS_1) 321 to the secondary cell base station (SCG_BS_2) 322 caused by the movement of the vehicle 2.

In step S100, the master cell base station (MCG_BS_1) 311 transmits, to the old secondary cell base station (SCG_BS_1) 321, a UE Context Release message indicating an instruction to release communication context secured for the UE 1.

In step S101, the master cell base station (MCG_BS_1) 311 transmits, to the UE 1, a release message (release) regarding the RRC connection. By execution of steps S100 and S101, the UE 1 recognizes that assignment of the communication context is changed from the old secondary cell base station (SCG_BS_1) 321 to the new secondary cell base station (SCG_BS_2) 322 (steps S76 and S74 in FIG. 7).

If the reception of a PCH signal from the new secondary cell base station (SCG_BS_2) 322 via the PCH 32a is successful in step S74 in FIG. 7 (YES in step S74), the processing proceeds to step S77. In step S77, the UE 1 temporarily transitions to RRC_CONNECTED in which DC is used with the master cell base station (MCG_BS_1) 311 and the new secondary cell base station (SCG_BS_2) 322.

Resumption of the payload data communication is not detected yet at this time after the upload of the captured image to the database 5 of the server is suspended by the UE 1. In this case, in step S102, the master cell base station (MCG_BS_1) 311, the secondary cell base station (SCG_BS_2) 322, and the core network 4 recognize this state as a condition for urging the UE 1 to transition from RRC_CONNECTED to RRC_INACTIVE.

Figure 10:
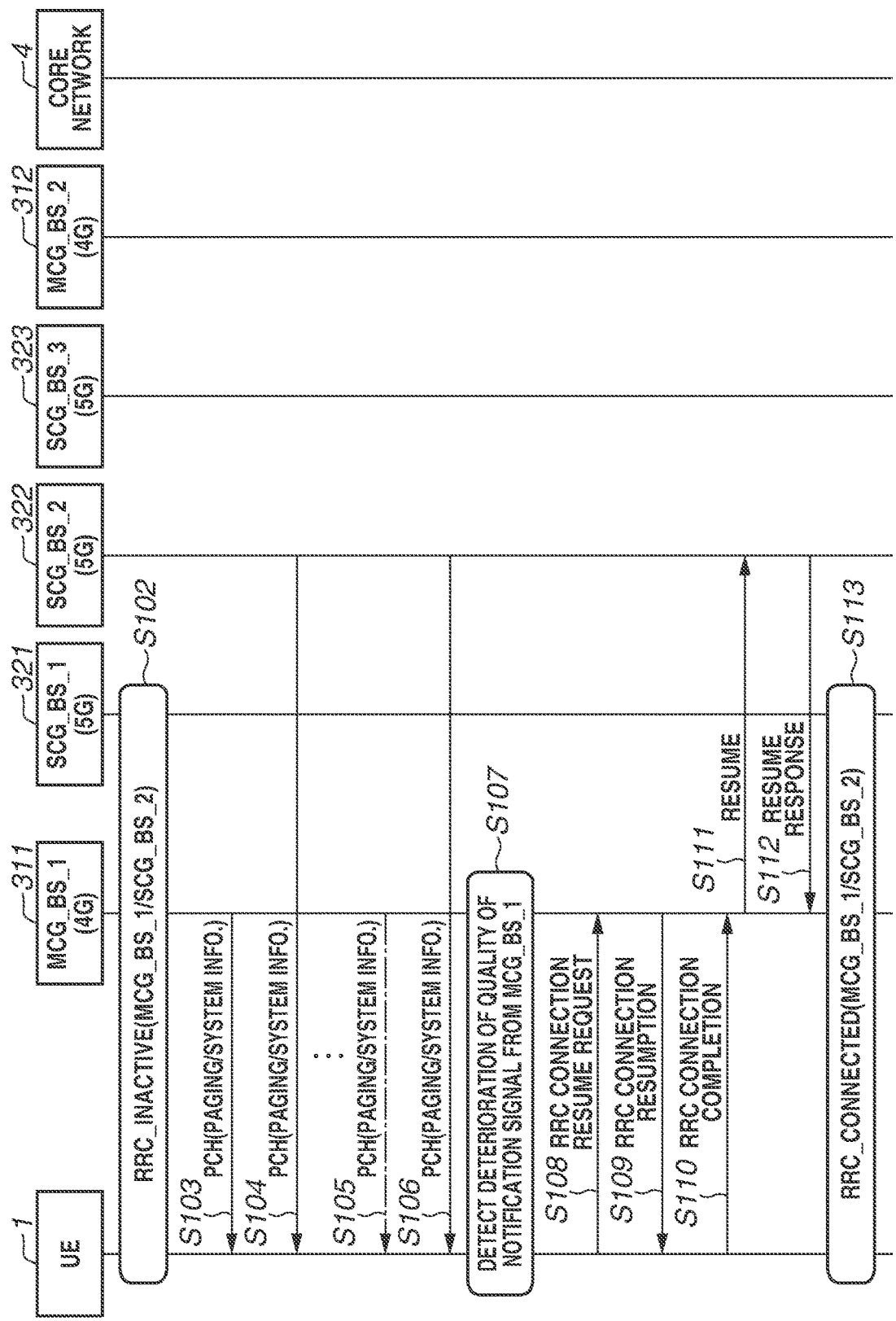
FIG. 10 is a diagram illustrating an example of a processing sequence between the communication apparatus according to the first exemplary embodiment and the plurality of cell groups when the communication apparatus moves between the plurality of wireless cells.

With reference to FIG. 10, the UE 1, which has transitioned to RRC_INACTIVE in step S102, periodically executes the PCH checking process described above with reference to FIG. 6.

More specifically, the UE 1 executes the PCH checking process at a timing when the master cell base station (MCG_BS_1) 311 transmits the PCH signal to the UE 1 in step S103 and at a timing when the secondary cell base station (SCG_BS_2) 322 transmits the PCH signal to the UE 1 in step S104.

At this time, the vehicle 2 on which the UE 1 is mounted further moves. At this stage, in step S105, the reception of the PCH signal from the master cell base station (MCG_BS_1) 311 via the PCH 31a is failed. In step S106, the PCH signal from the secondary cell base station (SCG_BS_2) 322 via the PCH 32a is received by the UE 1 at this stage. In this case, with the failure of the reception of the PCH signal transmitted to the UE 1 as a trigger, in step S107, the UE 1 detects deterioration of quality of the PCH signal from the master cell base station (MCG_BS_1) 311 via the PCH 31a caused by the further movement of the vehicle 2.

In a case where the vehicle 2 on which the UE 1 is mounted moves, the quality of the PCH signal from the master cell base station (MCG_BS_1) 311 deteriorates due to a continuous movement in a particular direction. Thus, even if the UE 1 continues waiting for the PCH signal from the master cell base station (MCG_BS_1) 311 via the PCH 31a, the reception of the PCH signal from the master cell base station (MCG_BS_1) 311 is not restored.

In steps S108 to S113, with the deterioration of the quality of the PCH signal transmitted from the master cell base station (MCG_BS_1) 311 via the PCH 31a as a trigger, the UE 1 transitions to RRC_CONNECTED with the master cell base station (MCG_BS_1) 311. Then, the UE 1 waits for the assignment of a new master cell base station executed on the core network 4 side.

Figure 11:
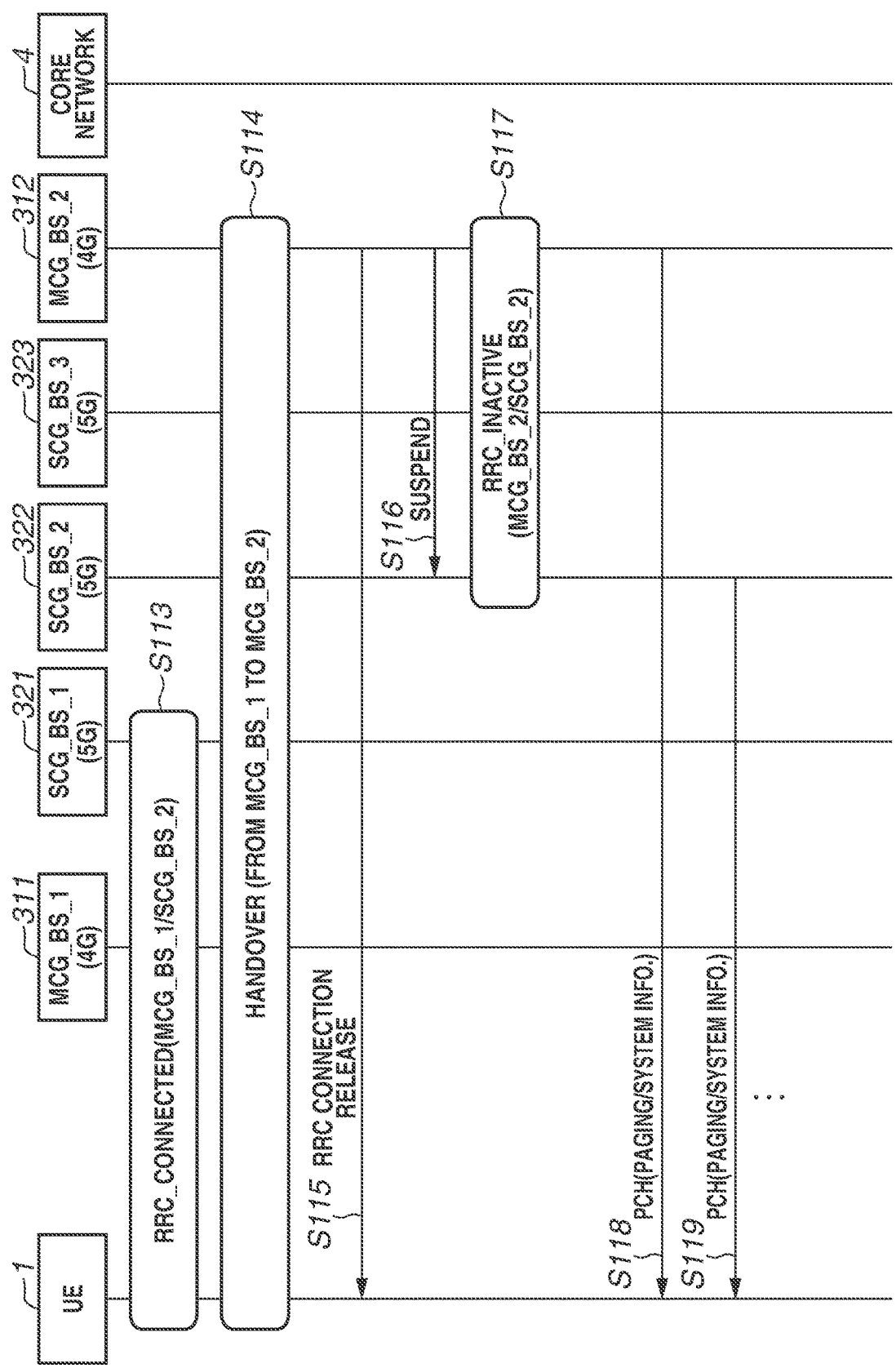
FIG. 11 is a diagram illustrating an example of a processing sequence between the communication apparatus according to the first exemplary embodiment and the plurality of cell groups when the communication apparatus moves between the plurality of wireless cells.

With reference to FIG. 11, in step S114, on the core network 4 side, it is determined that a handover process from the old master cell base station (MCG_BS_1) 311 to the new master cell base station (MCG_BS_2) 312 is required. Then, the handover process is executed.

Resumption of the payload data communication is not detected yet at this time after the upload of the captured image to the database 5 of the server is suspended by the UE 1. Thus, the master cell base station (MCG_BS_2) 312 as a handover destination and the core network 4 recognize this state as a condition for urging the UE 1 to transition from RRC_CONNECTED to RRC_INACTIVE.

In step S115, with recognition of the condition for transition to RRC_INACTIVE as a trigger, the master cell base station (MCG_BS_2) 312 transmits a message indicating an instruction to release the RRC connection to the UE 1.

In step S116, the master cell base station (MCG_BS_2) 312 transmits, to the secondary cell base station (SCG_BS_2) 322, a message indicating an instruction to suspend the communication with the UE 1.

Then, in step S117, the master cell base station (MCG_BS_2) 312 transitions to RRC_INACTIVE. With the reception of the messages in steps S115 and S116 as a trigger, the UE 1 and the secondary cell base station (SCG_BS_2) 322 also transition to RRC_INACTIVE.

The UE 1, which has transitioned to RRC_INACTIVE, periodically executes the PCH checking process described above with reference to FIG. 6.

After the vehicle 2 on which the UE 1 is mounted stops moving, the quality of a PCH signal transmitted from the master cell base station (MCG_BS_2) 312 to the UE 1 via the PCH 31a in step S118 and the PCH signal transmitted from the secondary cell base station (SCG_BS_2) 322 to the UE 1 via the PCH 32a in step S119 do not change.

With reference to FIG. 5, after the UE 1 recognizes stoppage of the vehicle 2 (NO in step S53), in step S55, the UE 1 stops monitoring of the PCH signal notified by the secondary cell base station (SCG_BS_2) 322 via the PCH 32a until the movement of the vehicle 2 is started.

Figure 12:
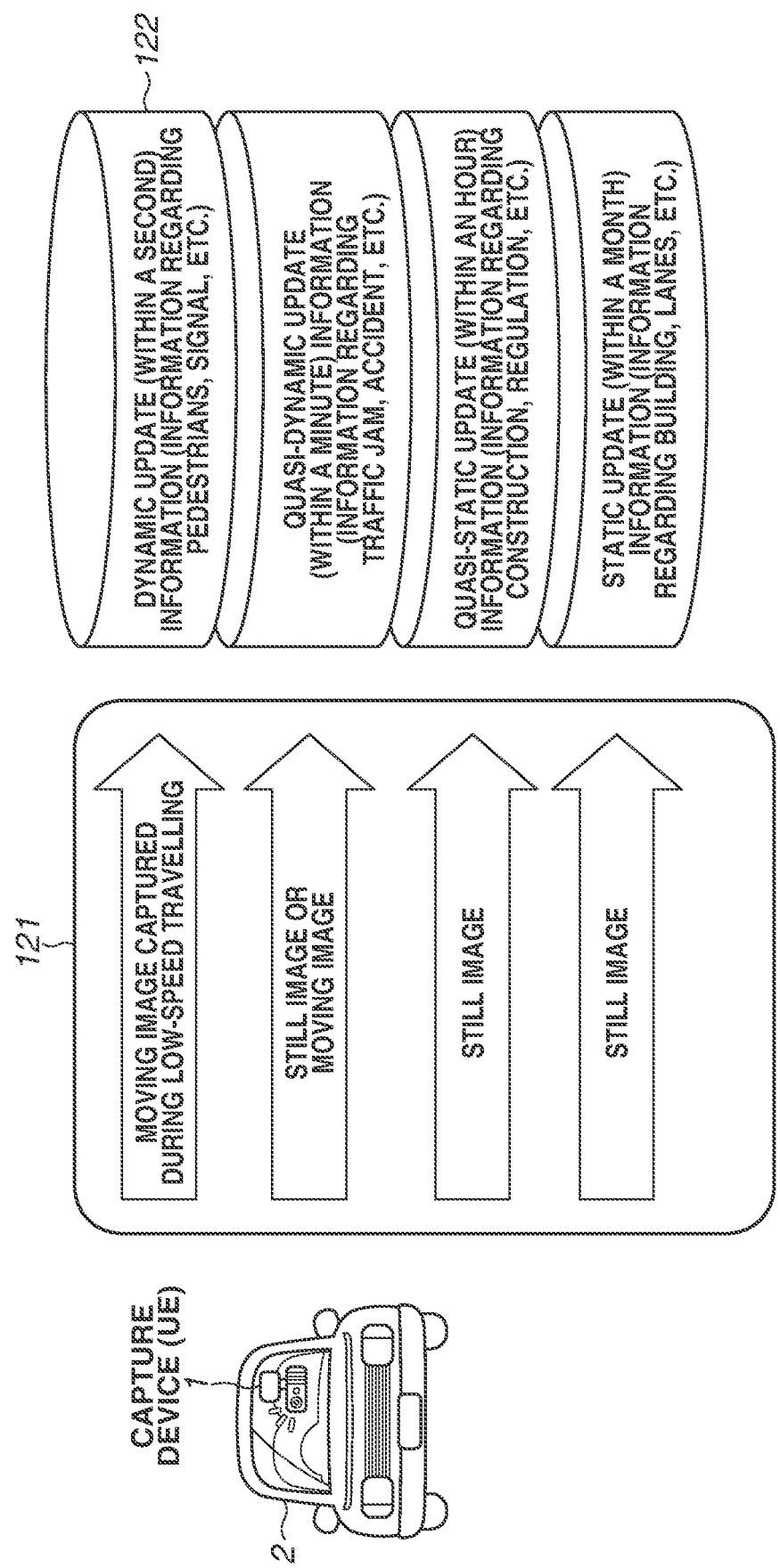
FIG. 12 is a diagram illustrating examples of types of uploaded images in the system where the captured image captured by the capture device (UE) according to the first exemplary embodiment is uploaded.

FIG. 12 illustrates examples of types of information uploaded to the database 5 in the map server, as a dynamic map creation server, by the UE 1, as the capture device mounted on the vehicle 2, and types of communication services corresponding to the types of information. The plurality of communication services illustrated in FIG. 12 is in a standby state while the UE 1 as the capture device is in RRC_INACTIVE, and is scheduled to be executed after the UE 1 returns to RRC_CONNECTED.

A dynamic map 122 illustrated in FIG. 12 is divided into pieces of information that are updated at different frequencies.

More specifically, the dynamic map 122 includes dynamic information that is updated about every second, quasi-dynamic information that is updated about every minute, quasi-static information that is updated about every hour, and static information that is updated about every month.

Among a plurality of types of communication services 121, for example, a moving image captured during low-speed travelling on a general road in which a changing state of pedestrians and traffic signals on the street can be grasped is uploaded as dynamic information about every second. For example, the moving image or the still image captured during travelling in which, with detection of an image of a traffic jam or an accident as a trigger, occurrence of the detected traffic jam or accident can be grasped is uploaded as quasi-dynamic information about every minute.

For example, a still image captured during travelling in which, with detection of an image of construction or regulation as a trigger, occurrence of the detected construction or regulation can be grasped is uploaded as quasi-static information about every hour. For example, a moving image or a still image captured during travelling in which, with detection of an image of a building or a lane that is not included in map information in use as a trigger, the detected building or an increase in lanes can be grasped is uploaded as static information about every month.

In the above-described use case of the dynamic map creation server, in the present exemplary embodiment, during the period when the captured image is to be uploaded, the UE 1 transitions to RRC_CONNECTED. During the period when the captured image is not to be uploaded, the UE 1 transitions to RRC_INACTIVE. Then, while the vehicle 2 on which the UE 1 as the capture device is mounted is travelling, in the RRC_INACTIVE state, the UE 1 monitors PCHs for both a master cell base station and a secondary cell base station and receives PCH signals from both the master cell base station and the secondary cell base station.

To detect the movement of the UE 1 as the capture device mounted on the vehicle 2 according to the present exemplary embodiment, for example, the movement detection unit 111 of the UE 1 may detect the movement by using an acceleration sensor. Alternatively, the movement may be detected by the GPS reception unit 106 of the UE 1 by updating a GPS signal transmitted from the GPS.

Yet alternatively, the movement may be detected by the power supply source determination unit 113 of the UE 1 by monitoring a state of each power feed line of the vehicle 2 on which the UE 1 is mounted and detecting a change in a power feed line to the vehicle 2. For example, while power is fed from an ignition (IG) power supply, it may be detected that the vehicle 2 is moving. While power is fed from an accessory (ACC) power supply, it may be detected that the vehicle 2 is stopped.

Yet alternatively, the power supply source determination unit 113 of the UE 1 may detect the movement based on a change in a value of a received signal strength indicator (RSSI) of a PCH signal intermittently notified by a base station.

As described above, according to the present exemplary embodiment, the state of the communication apparatus 1 transitions between RRC_CONNECTED and RRC_INACTIVE in the state where unicast communication paths via a master cell base station and via a secondary cell base station are secured using DC. For example, during the period when a captured image is to be uploaded, the communication apparatus 1 transitions to RRC_CONNECTED. During the period when the captured image is not to be uploaded, the communication apparatus 1 transitions to RRC_INACTIVE.

Then, the communication apparatus 1 detects the movement state of the communication apparatus 1. The communication apparatus 1 switches monitoring target channels so that, while the communication apparatus 1 is detecting the movement, the communication apparatus 1 monitors PCH signals transmitted from both the master cell base station and the secondary cell base station via PCHs for the respective base stations and, while the communication apparatus 1 is not detecting the movement, the communication apparatus 1 monitors only the PCH signal transmitted from the master cell base station via the PCH for the master cell base station.

Consequently, in a communication apparatus using DC that enables broadband communication, it is possible to achieve a reduction in power consumption while avoiding a reduction in service responsiveness caused by the movement of the apparatus.

Figure 13:
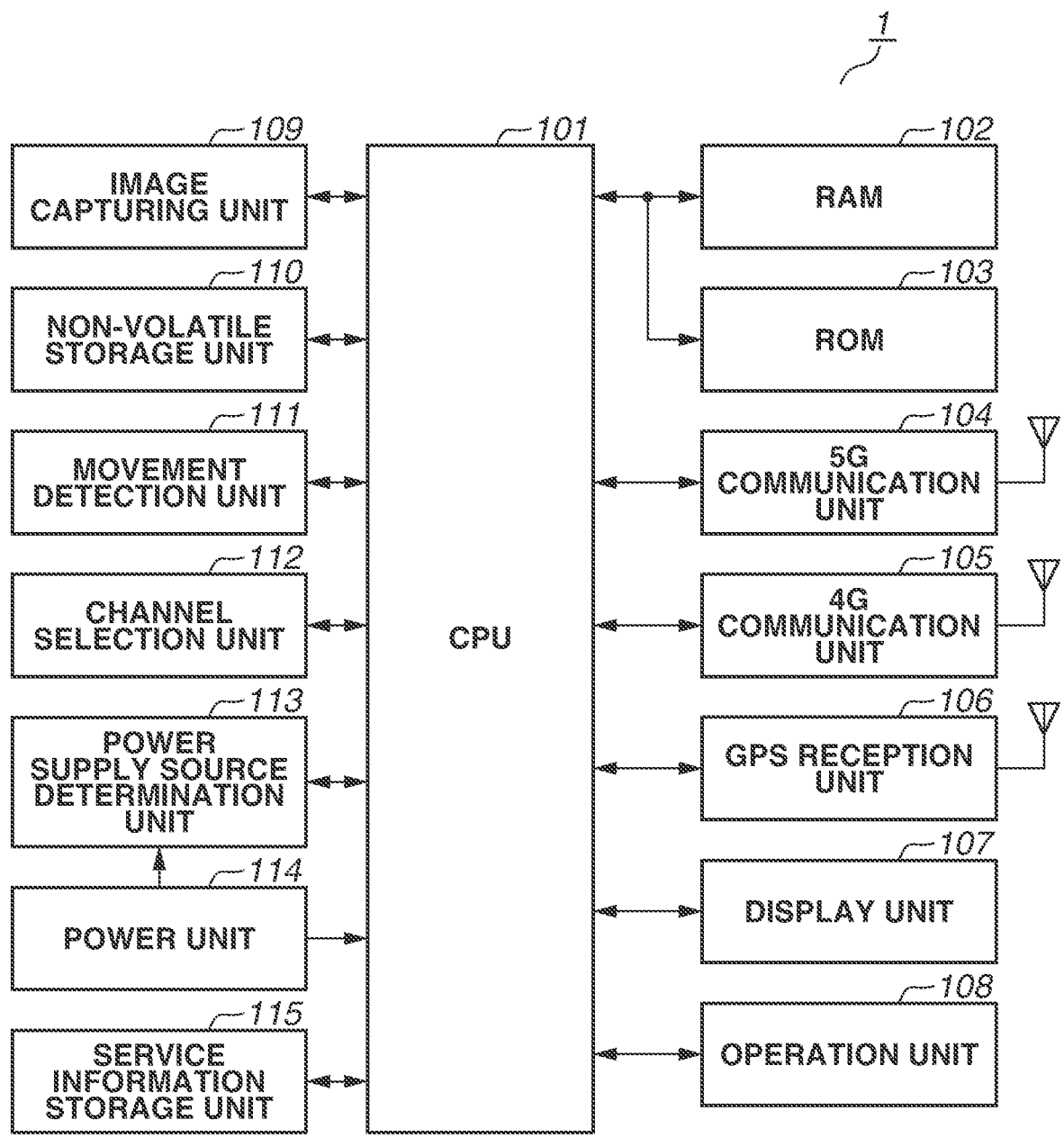
FIG. 13 is a block diagram illustrating an example of a hardware and functional configuration of a communication apparatus according to a second exemplary embodiment.
Figure 14:
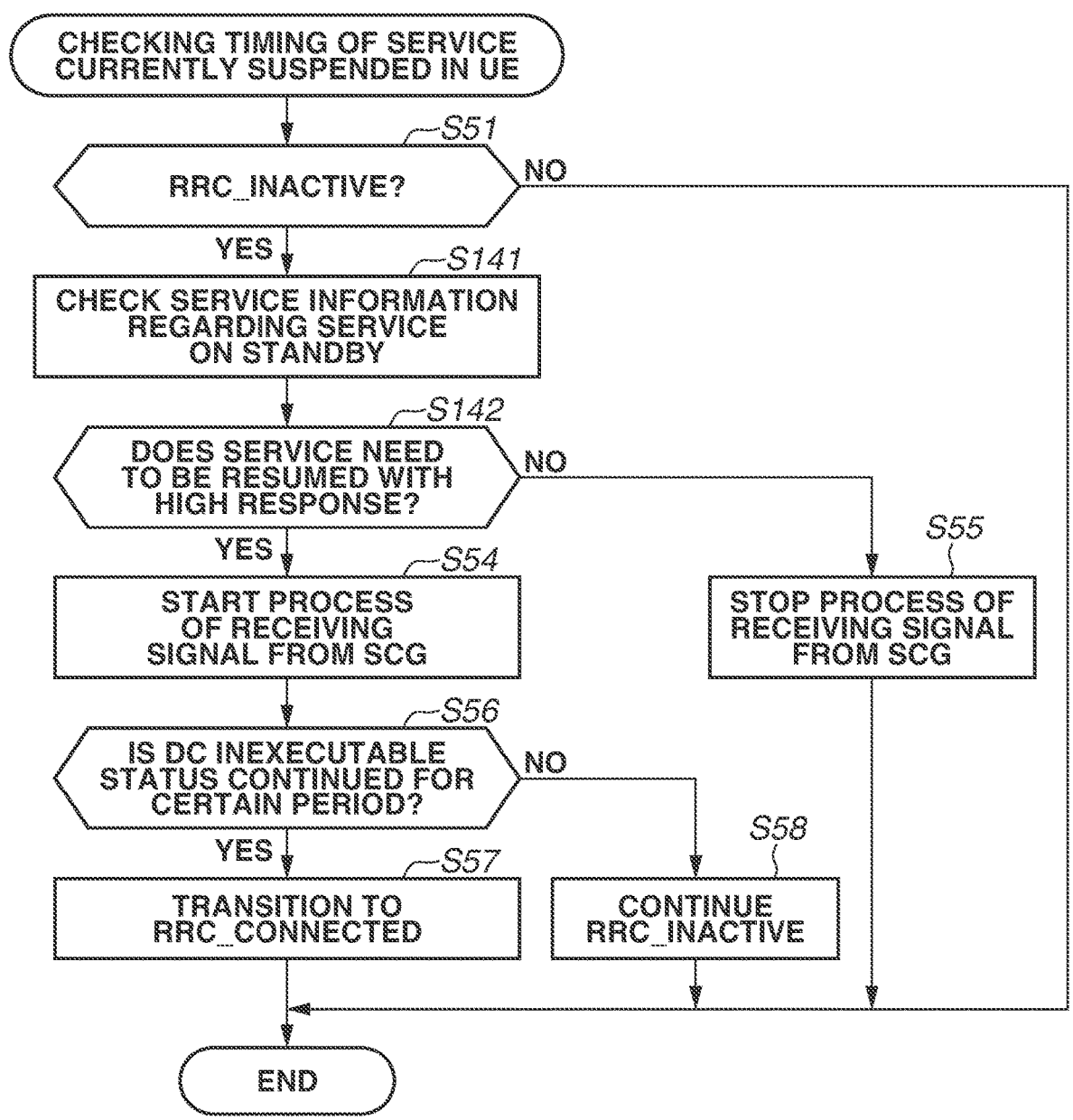
FIG. 14 is a flowchart illustrating an example of a processing procedure of a monitoring control process executed when the communication apparatus according to the second exemplary embodiment monitors a service on standby.

With reference to FIGS. 13 and 14, differences between a second exemplary embodiment and the first exemplary embodiment are described in detail below. In the first exemplary embodiment, a PCH to be monitored is selected, during RRC_INACTIVE, based on the movement state of the communication apparatus 1. In contrast, in the second exemplary embodiment, a PCH to be monitored is selected, during RRC_INACTIVE, based on response characteristics required by a service on standby that is to be executed when the communication apparatus 1 returns to RRC_CONNECTED as the internal control state of the communication apparatus 1.

FIG. 13 is a diagram illustrating an example of the hardware and function configuration of a UE 1 according to the second exemplary embodiment. As illustrated in FIG. 13, the UE 1 according to the present exemplary embodiment includes a service information storage unit 115 in addition to components like those in the first exemplary embodiment illustrated in FIG. 1. In the UE 1 illustrated in FIG. 13, the movement detection unit 111 may be omitted.

With respect to each service provided in the UE 1, the service information storage unit 115 stores responsiveness required after the UE 1 returns to RRC_CONNECTED, such as a high responsiveness or a low responsiveness, as service information. The service information can be defined based on a real time quality required by a service to be resumed, an amount of data to be transmitted, and a movement state of the UE 1.

For example, in the use case where the UE 1 as the capture device is mounted on the vehicle 2, a service that streams a moving image of pedestrians in the vicinity of an intersection captured while the vehicle 2 is travelling and a steering operation of the vehicle 2 is performed requires high responsiveness. On the other hand, a service that distributes a captured image for crime prevention triggered by detection of an abnormality by a sensor mounted on the vehicle 2 while the vehicle 2 is not travelling does not require high responsiveness. As described above, in the present exemplary embodiment, the service information storage unit 115 stores the response characteristics for each service on standby to be executed by the UE 1.

<PCH Automatic Selection Process Based on Monitoring of Service Scheduled to be Executed by UE 1>

FIG. 14 is a flowchart illustrating an example of the processing procedure of a monitoring control processing executed when the UE 1 according to the second exemplary embodiment monitors a service scheduled to be operated after the UE 1 returns to RRC_CONNECTED.

The UE 1 monitors the state of a service scheduled to be executed by the UE 1 on a constant cycle. Every time the monitoring timing of the state of the service comes, the UE 1 starts the processing in FIG. 14.

A process of step S51 is like that of step S51 illustrated in FIG. 5 in the first exemplary embodiment.

If the UE 1 is in RRC_INACTIVE in step S51 (YES in step S51), the processing proceeds to step S141. In step S141, the service information storage unit 115 of the UE 1 determines responsiveness required by the service on standby scheduled to be executed after the UE 1 returns to RRC_CONNECTED with reference to the stored service information.

If it is determined in step S142 that the service scheduled to be executed after the UE 1 returns to RRC_CONNECTED does not need to be resumed with high responsiveness (NO in step S142), the processing proceeds to step S55. In step S55, the UE 1 stops a process of receiving a PCH signal transmitted from the secondary cell base station (SCG_BS_1) 321 to the UE 1 via the PCH 32a.

If it is determined that the service scheduled to be executed after the UE 1 returns to RRC_CONNECTED needs to be resumed with high responsiveness (YES in step S142), the processing proceeds to step S54. In step S54, the UE 1 starts the process of receiving the PCH signal transmitted from the secondary cell base station (SCG_BS_1) 321 to the UE 1 via the PCH 32a of a secondary cell.

Processes of steps S56 to S58 are like processes of steps S56 to S58 illustrated in FIG. 5.

After a return to RRC_CONNECTED is completed, the UE 1 sets a wireless communication path for DC again based on control defined in the 5G public wireless standard.

With reference to FIG. 12, for example, the UE 1 can switch monitoring target channels so that, while the UE 1 is detecting the wait for the upload of "a moving image captured during low-speed travelling on a general road", which requires high responsiveness, the channel selection unit 112 of the UE 1 monitors PCH signals transmitted from both a master cell base station and a secondary cell base station and, while the UE 1 is detecting the wait for the upload of "a moving image or a still image captured during travelling" for grasping the occurrence of construction or regulation on a roadway, which does not require high responsiveness, the channel selection unit 112 of the UE 1 monitors only the PCH signal transmitted from the master cell base station.

For example, if a service that requires a response within one second is to be resumed, the channel selection unit 112 of the UE 1 may monitor the PCH signals from both the master cell base station and the secondary cell base station.

As described above, in the present exemplary embodiment, the state of the communication apparatus 1 transitions between RRC_CONNECTED and RRC_INACTIVE in the state where unicast communication paths via a master cell base station and via a secondary cell base station are secured using DC.

Then, the communication apparatus 1 detects the state of a service on standby in the communication apparatus 1. The communication apparatus 1 switches between monitoring target channels so that, while the communication apparatus 1 is detecting that a service that requires high responsiveness is on standby, the communication apparatus 1 monitors PCH signals transmitted from both the master cell base station and the secondary cell base station via PCHs for the respective base stations and, while the communication apparatus 1 is not detecting that the service that requires the high responsiveness is on standby, the communication apparatus 1 monitors only the PCH signal transmitted from the master cell base station via the PCH for the master cell base station.

Consequently, in a communication apparatus using DC that enables broadband communication, it is possible to achieve a reduction in power consumption while avoiding a reduction in service responsiveness caused by the movement of the apparatus.

The present disclosure can also be implemented by a program for achieving part or one or more functions of the above-described exemplary embodiments. More specifically, the present disclosure can be implemented by processing of supplying the program to a system or an apparatus via a network or a storage medium and causing one or more processors of a computer (or a CPU or a microprocessor unit (MPU)) of the system or the apparatus to read and execute the program. The program recorded in a computer-readable recording medium may be provided.

The present disclosure is not limited to implementation of the functions according to the exemplary embodiments by executing the program read by the computer. For example, based on an instruction from the program, an operating system (OS) operating on the computer may perform part or all of actual processing, accordingly implementing the functions according to the above-described exemplary embodiments.

As described above, in a communication apparatus that simultaneously connects to a plurality of base stations, it is possible to avoid delay in provision of a service on a network while reducing power consumption.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-081071, filed Apr. 22, 2019, which is hereby incorporated by reference herein in its entirety.

What is claimed is:

1. A communication apparatus comprising:
   one or more memories having instructions stored therein; and
   one or more processors that, upon execution of the instructions, are configured to:
   after a wireless communication path to each of a first base station and a second base station is established by using Dual Connectivity technique compliant with a 3rd Generation Partnership Project standard, transition from an RRC_CONNECTED state to an RRC_INACTIVE state compliant with the 3rd Generation Partnership Project standard; and
   after transitioning to the RRC_INACTIVE state, perform first control to listen substantially simultaneously to both a notification signal issued from the first base station and a notification signal issued from the second base stations.

2. The communication apparatus according to claim 1,
wherein the first base station is a base station for a master cell compliant with the 3rd Generation Partnership Project standard, and
wherein the second base station is a base station for a secondary cell.

3. The communication apparatus according to claim 1,
wherein the notification signal is a paging signal compliant with the 3rd Generation Partnership Project standard, and the communication apparatus receives the paging signal by listening to paging channels via which the first base station and the second base station broadcast paging signals.

4. The communication apparatus according to claim 3, wherein the communication apparatus establishes the wireless communication path to each of the first and second base stations using a dual connectivity function compliant with the 3rd Generation Partnership Project standard.

5. The communication apparatus according to claim 1, wherein the one or more processors are further configured to perform second control to receive a notification signal from one of the first and second base stations and not to receive a notification signal from the other of the first and second base stations, in a case where a condition of the communication apparatus is a first condition after transitioning to the RRC_INACTIVE state,
wherein in a case where the condition of the communication apparatus is a second condition after transitioning to the RRC_INACTIVE state, the first control is performed.

6. The communication apparatus according to claim 5 wherein the first condition is a condition such that a communication service to be resumed by the communication apparatus after returning to the RRC_CONNECTED state requires a high responsiveness, and the second condition is a condition such that a communication service to be resumed by the communication apparatus after returning to the RRC_CONNECTED state does not require a high responsiveness.

7. A method comprising:
after a wireless communication path to each of a first base station and a second base station is established by using Dual Connectivity technique compliant with a 3rd Generation Partnership Project standard, transitioning from an RRC_CONNECTED state to an RRC_INACTIVE state compliant with a 3rd Generation Partnership Project standard; and
after transitioning to the RRC_INACTIVE state, performing first control to listen substantially simultaneously to both a notification signal issued from the first base station and a notification signal issued from the second base stations.

8. A non-transitory computer readable medium storing instructions for causing a communication apparatus to perform a process comprising:
after a wireless communication path to each of a first base station and a second base station is established by using Dual Connectivity technique compliant with a 3rd Generation Partnership Project standard, transitioning from an RRC_CONNECTED state to an RRC_INACTIVE state compliant with a 3rd Generation Partnership Project standard; and
after transitioning to the RRC_INACTIVE state, performing first control to listen substantially simultaneously to both a notification signal issued from the first base station and a notification signal issued from the second base stations.

\* \* \* \* \*